July 23, 1957  R. F. NEWBY  2,800,003
BEVERAGE COOLING UNIT
Filed March 26, 1956  2 Sheets-Sheet 1

INVENTOR.
RICHARD F. NEWBY
BY: Harold B. Hood
ATTORNEY

July 23, 1957 R. F. NEWBY 2,800,003
BEVERAGE COOLING UNIT
Filed March 26, 1956 2 Sheets-Sheet 2

INVENTOR.
RICHARD F. NEWBY
BY: Harold B. Hood,
ATTORNEY

2,800,003

BEVERAGE COOLING UNIT

Richard F. Newby, Anderson, Ind.

Application March 26, 1956, Serial No. 573,961

1 Claim. (Cl. 62—141)

The present invention relates to a beverage cooling unit. The device of the present disclosure has been designed primarily for use in connection with a root beer dispensing system of otherwise-conventional design; and therefore it has been illustrated and will be described in that environment. However, it will be clear that the invention may well have utility in other environments, wherever it may be desired to cool any medium which is contained in a receptacle.

The primary object of the invention is to provide improved means for maintaining a subatmosphere temperature upon a substance to be dispensed.

Further objects of the invention will appear as the description proceeds.

To the accomplishment of the above and related objects, my invention may be embodied in the form illustrated in the accompanying drawings, attention being called to the fact, however, that the drawings are illustrative only, and that change may be made in the specific construction illustrated and described, so long as the scope of the appended claim is not violated.

Figure 1:
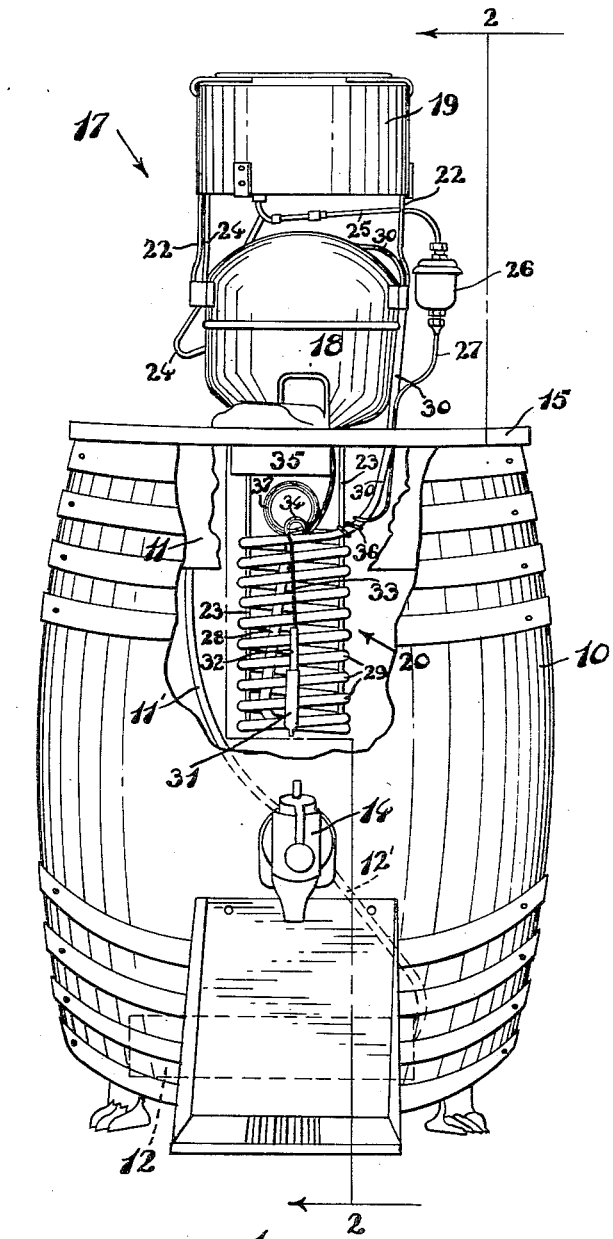
Figure 2:
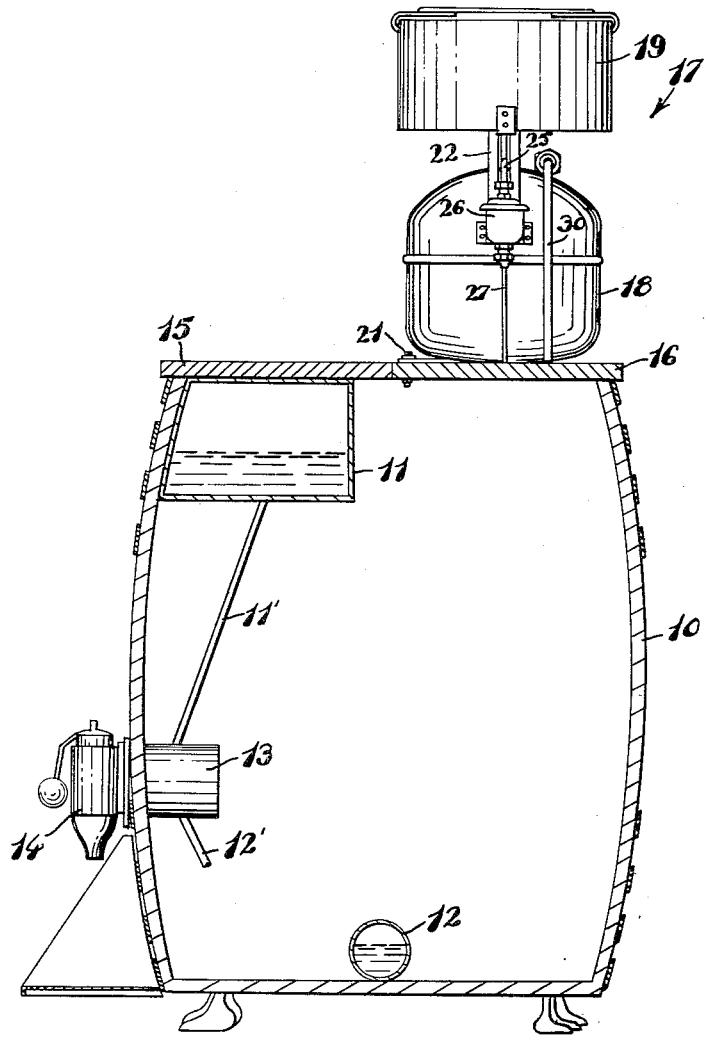

Fig. 1 is an elevation of a root beer dispenser equipped with an embodiment of my invention, parts being broken away for clarity of illustration; and Fig. 2 is a section thereof taken substantially on the line 2—2 of Fig. 1.

It is conventional, in root beer dispensing establishments, to provide a barrel 10 in which is mounted a syrup vat 11 and one or more containers 12 for carbonated water, under pressure. The vat 11 is mounted near the top of the barrel and is connected, by a preferably flexible conduit 11', with a mixing chamber 13; while the container or containers 12 are customarily supported on the bottom of the barrel and are connected, by a preferably flexible conduit 12', with the mixing chamber 13. Because the containers 12 are charged with carbonated water under pressure, their contents will flow under such pressure to the mixing chamber 13, while the syrup from the vat 11 will flow by gravity to the mixing chamber. A spigot 14, mounted outside the barrel 10, is operable to control the flow of mixed beverage from the chamber 13.

It is conventional to fill the barrel with water, and to refrigerate that water, in order to maintain the contents of the vat 11, containers 12 and mixing chamber 13, at a desired subatmospheric temperature. In some establishments, the barrel is cooled by packing it in ice, while in other establishments, the evaporator unit of a phase-change refrigerating system is coiled about the external walls of the barrel. Conventional refrigerating systems available on the market are so designed and constructed that the compressor and condenser thereof occupy a good deal of floor space; and, since floor space at the dispenser is always at a premium in establishments of the character here under consideration, the compressor and condenser of such refrigerating systems are usually located in a storage room or the like, remote from the dispenser, and the refrigerant must flow, between the compressor and the evaporator, through relatively long conduits.

According to the present invention, a cover for the conventional barrel 10 comprises two substantially semi-circular pieces 15 and 16. The cover part 15 overlies the vat 11 and may be removed, independently of the cover part 16, to provide access to said vat for filling, cleaning and the like. The mating cover part 16 carries the refrigerating system indicated generally by the reference numeral 17. Such system comprises a housing 18 containing a compressor and a motor for driving the same, a condenser 19 suitably supported from the housing 18, and an evaporator indicated generally by the reference numeral 20. As is clearly shown, the housing 18 is secured to the upper or outer surface of the cover part 16, by bolts, screws, or other equivalent fastening means indicated by the reference numeral 21; and the condenser 19 is supported above the housing 18 by straps 22, while the evaporator is suspended, by straps 23, from the lower surface of the cover part 16. Thus, when said cover part is in place on the barrel, as shown in the drawings, the evaporator 20 is positioned within the barrel, while the motor, compressor and condenser are located outside the barrel.

Operation of the compressor forces hot, compressed refrigerant in the gaseous phase through the conduit 24 to the condenser where, in the well-understood manner, the refrigerant undergoes a change to the liquid phase. Liquid refrigerant flows through the conduit 25 to a drier and strainer 26; and thence, through the capillary tube 27, to the pipe 28 constituting a portion of the evaporator 20. The evaporator continues, in a series of coils 29, to a leadoff pipe 30 through which the spent refrigerant is returned to the intake side of the compressor.

It is desirable to control the operation of the compressor-driving motor in accordance with variations in the temperature of the evaporator 20; and to that end I provide an element 31 which may be called a bucket. The bucket 31 is open at its top and is preferably provided with a restricted opening at its bottom, and is formed to provide a substantially cylindrical socket for the snug, removable reception of a cartridge 32. As is clearly shown in Fig. 1, the bucket 31 is fixed, as, for instance, by welding, in heat-exchanging engagement with the coils of the evaporator 20; and preferably said bucket will span, and be directly secured to, two or more of the turns of the evaporator coil.

The cartridge or bulb 32 is closed except for its communication, through a capillary tube 33, with the pressure-responsive element of a conventional pressure-actuated switch electrically connected in the energizing circuit for the compressor-driving motor, and enclosed within a casing 35 which is preferably secured to the inner or lower surface of the cover part 16. The bulb 32 and tube 33 are filled with a volatile liquid such as, for instance, the same kind of refrigerant as is circulated in the refrigerating system so that, when the temperature of the evaporator rises above a predetermined value, the increase in pressure in the bulb 32 will actuate the switch in the casing 35 to energize the motor which drives the compressor of the refrigerating system; and when the temperature at the evaporator falls below a predetermined value, the pressure in the bulb 32 will drop sufficiently to permit the motor-controlling switch to open.

In order to improve the efficiency of the refrigerating system, a portion of the capillary tube 27 is wrapped several times around a portion of the tube 30 within the barrel 10, as at 36; and I find it preferable, in order to provide a proper length for the capillary tube 27, to arrange a portion of its length as a coil 37 within the barrel. Similarly, a portion of the length of the capillary tube 33 may be arranged in a coil as at 34.

In use, the parts are assembled in the manner most clearly illustrated in Fig. 1, the vat 11 is filled or partially filled with syrup, the cylinders or containers 12 are charged with carbonated water under pressure, and the compressor-driving motor is connected to a suitable source of electrical energy. The water, of course, will initially be at a temperature above that desired; and therefore the fluid in the bulb 32 will actuate the switch in the housing 35 to energize the compressor-driving motor. The refrigerating system will then operate, in a conventional manner, until such time as the temperature of the evaporator reaches its preset, low value. Since the evaporator is disposed directly in the water, which is the circumambient medium in which the vat 11, cylinders 12 and mix chamber 13 are disposed, the liquids therein will attain substantially the temperature of the water, which will be substantially the mean temperature of the evaporator 20.

When it is desired to refill the vat 11 or to replace the cylinders 12, such service can be effected, in most instances, by removal of the cover part 15 only. However, for thorough cleaning of the interior of the barrel, for cleaning of the evaporator, or for repair or replacement of the refrigerating system or any part thereof, the cover part 16 may likewise be removed. Thereby, all of the parts of the refrigerating sysem immediately become readily accessible. In ordinary use, the refrigerating system, being directly mounted on the barrel covered part 16, is out of the way; and furthermore, the arrangement of the present disclosure obviates the neecssity for long reaches of tubing between the evaporator and the other parts of the refrigerating system and eliminates the neecssity for couplings and connections which must be made or separated, in conventional systems, in case repair of any part of the refrigerating system becomes necessary.

I claim as my invention:

A beverage cooling unit comprising an open-topped receptacle, a syrup vat supported in said receptacle near the top thereof, a container for liquid under pressure in said receptacle, a mixing chamber, means connecting said vat and said container with said mixing chamber, a spigot for dispensing liquid from said mixing chamber, said spigot being located outside said receptacle, a cover for said receptacle comprising one part overlying said vat and another part, said cover parts being independently movable relative to said receptacle, a phase-change refrigerating unit supported from said cover part, said unit comprising a compressor, a motor for driving said compressor, a condenser, and an evaporator, said evaporator projecting downwardly from the lower surface of said cover part and said motor, compressor and condenser being supported above the upper surface of said cover part so that, when said other cover part is in place on said receptacle, said evaporator is disposed within said receptacle, a drier, conduit means for conducting compressed refrigerant from said compressor to said condenser, conduit means for conducting refrigerant from said condenser to said drier, a capillary tube for conducting refrigerant from said drier to said evaporator, conduit means for conducting spent refrigerant from said evaporator to said compressor, pressure-responsive switch means dominating said motor, a capsule containing a volatile liquid disposed in heat-exchanging relation with said evaporator, a capillary tube connecting the interior of said capsule operatively with said switch means, said evaporator comprising a tubular coil, and metallic bucket fixed to said coil in heat-exchanging contact with a plurality of turns of said coil, said bucket being open at its upper end and snugly receiving said capsule.

References Cited in the file of this patent
UNITED STATES PATENTS

| | | |
|---|---|---|
| 2,188,839 | Markley et al. | Jan. 30, 1940 |
| 2,381,013 | Tanner | Aug. 7, 1945 |
| 2,479,011 | Kemper | Aug. 16, 1949 |
| 2,691,282 | Snelson | Oct. 12, 1954 |